United States Patent

Murao et al.

[11] 3,922,067
[45] Nov. 25, 1975

[54] ELECTRO-OPTICAL DISPLAY DEVICE INCLUDING AN IMPROVED LIQUID CRYSTAL COMPOSITION

[75] Inventors: Kenji Murao; Kazuhisa Toriyama, both of Hitachi; Norimasa Kamezawa, Ibaraki; Teruo Kitamura, Hitachi, all of Japan

[73] Assignee: Hitachi, Ltd., Japan

[22] Filed: Feb. 22, 1974

[21] Appl. No.: 444,742

[52] U.S. Cl............................. 350/160 LC; 252/299
[51] Int. Cl.²............................................. G02F 1/13
[58] Field of Search.. 350/160 LC; 252/299, 408 LC

[56] References Cited
UNITED STATES PATENTS

| | | | |
|---|---|---|---|
| 3,499,112 | 3/1970 | Heilmeier et al. | 350/160 LC |
| 3,656,834 | 4/1972 | Haller et al. | 350/160 LC |
| 3,697,150 | 10/1972 | Wysocki | 350/160 LC |
| 3,809,456 | 5/1974 | Goldmacher et al. | 350/160 LC |

Primary Examiner—Edward S. Bauer
Assistant Examiner—Matthew W. Koren

[57] ABSTRACT

An electro-optical display device comprising a nematic liquid crystal layer, a means for supporting the layer, and a means for applying an electric field to the layer by multiplexing, said liquid crystal layer containing an effective amount of at least one of the polyhalides of organic quaternary nitrogen compounds. The electro-optical display device has improved multiplexed, driving characteristics, and particularly a stable threshold voltage against changes in temperature.

27 Claims, 6 Drawing Figures

ELECTRO-OPTICAL DISPLAY DEVICE INCLUDING AN IMPROVED LIQUID CRYSTAL COMPOSITION

This invention relates to an electro-optical display device containing a nematic liquid crystal composition for displaying numerical figures, letters, graphs, images, etc.

Several display devices utilizing nematic liquid crystals have been already proposed. One of the devices is based on a dynamic scattering mode of the nematic liquid crystal. When an electric field is applied to a nematic liquid crystal film, the liquid crystalline layer is disturbed, and light beams incident onto the film layer are scattered to show a white turbidity. The intensity of scattered components of the incident light beams depends upon the intensity of the applied electric field, and thus a kind of an electro-optical effect is recognized in this system. That is, the display device utilizes this electro-optical effect, so that a desired pattern can be displayed by switching the applied voltages into various voltage levels corresponding to the input signals. The display devices of such kinds can be drived under very small power consumption at relatively low applied voltages. Therefore, such a display device is useful for digital clocks, small table-type electronic computers, electrical measuring instruments, etc.

When a large number of desired points or segments on a display panel are displayed in such a device, it is convenient to drive, for example, a matrix type display device by multiplexing. To drive a device having more than a few display points by multiplexing with relatively simple electronic circuitry, a liquid crystalline material must fulfil the electrooptical characteristics as follows:

1. The curve of the applied voltage versus the scattered light intensity has a sharp threshold,
2. A quick response against the application of voltage,
3. Light scattering can be brought about even if a voltage of short pulse width is applied,
4. Sufficiently high contrast ratio should be obtained.

In addition, it is necessary for the low voltage driving that the liquid crystal material has a low threshold voltage for light scattering. Furthermore, the threshold voltage should be less dependent upon a temperature within the service temperature range.

To improve said characteristics, it is effective to add ionic substances to the liquid crystalline material. The effective ionic substances include quaternary ammonium halides, but the addition of the quaternary ammonium halide has the following problems.

Solubility of the ammonium halides in the liquid crystalline material is very small, and to obtain the effect of the addition, it is necesssary to dissolve the ammonium halides in the liquid crystalline material nearly up to their saturation. Thus, the ammonium halides often deposit in the liquid crystalline materials, and consequently the liquid crystal display device is damaged. That is, the amount of ammonium halides to be added is inevitably limited, and said characteristics, especially a response speed of scattering against the applied voltage, cannot be obtained sufficiently.

For a reliable display device, it is necessary to use a liquid crystal composition which can quickly respond to an application of voltage of short pulse width, and has a sharp threshold in the curve of scattered light intensity versus applied voltage and a low threshold voltage suitable for low voltage driving, in which the added substance is not deposited. An object of the present invention is to provide an electro-optical display device utilizing a liquid crystal composition having a readily attainable dynamic scattering effect at an applied voltage of short pulse width.

Another object of the present invention is to provide an electro-optical display device capable of applying a voltage to a number of optical segments by multiplexing, voltage application system.

To attain the foregoing objects and obtain a stable device against changes in temperature, a nematic liquid crystal composition containing an effective amount of at least one of polyhalides of quaternary nitrogen compounds is used in a liquid crystal, electro-optical display device in the present invention.

The above-mentioned objects and other objects of the present invention as well as features of the present invention will be apparent from the following detailed description by way of drawings.

Figure 1:
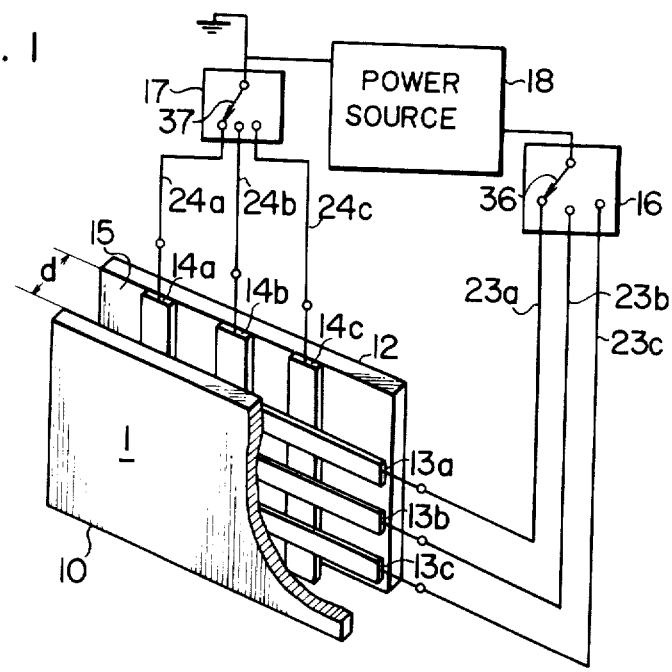
FIG. 1 is a partially cross-sectional perspective view of one embodiment of electro-optical display devices, to which the present invention is applied.

The well known, crossed lattice optical display device is shown in FIG. 1 as one example of the electro-optical device to which the present invention will be applied. However, the scope of the present invention is never restricted to such a device as illustrated in FIG. 1, but it should be understood that one embodiment is shown in FIG. 1 to facilitate the understanding of the present invention. Particularly since the present invention is applicable to a display device made up with a combination of a large number of segments, as will be described later, it should be understood that the following description will not limit the scope of the present invention.

In FIG. 1, a crossed lattice optical display device 1 has a transparent glass back support plate 12 and a transparent glass front support plate 10. These two support plates are placed at a distance $d$ of usually about 5 to 30 microns from each other, and appropriate liquid crystals (not shown in the drawing) are inserted into a space 15 between these support plates. A plurality of transparent electrodes 13a, 13b and 13c are arranged in parallel on the front support plate 10, and a plurality of transparent electrodes 14a, 14b and 14c are arranged in parallel on the back support plate 12. The electrodes 13a, 13b and 13c of the device 10 are connected to a switch 16 through connecting means 23a, 23b and 23c, respectively, and the electrodes 14a, 14b and 14c to the switch 17 through connecting means 24a, 24b and 24c, respectively. The switches 16 and 17 are connected to a grounded power source 18 through contact means 36 and 37, respectively. In the power source a pulse generator and control means are included to selectively give pulses to the electrodes.

In the transmission-type display device an observer is positioned at a side opposite to the light incident side. The liquid crystalline materials at intersections of the electrodes are disturbed when a sufficiently high voltage is applied between the electrodes, and scatter the incident light. As a result, the observer can perceive that the disturbed parts are darker than other non-disturbed parts.

In the reflection-type display device, the observer is positioned at the same side as the light incident side, and observes the reflected light which is scattered by the turbulence of the liquid crystals and reflected on a reflective film formed on the inside surface (the side in contact with the liquid crystals) of the back support plate of the display device.

As the transparent support plates, various kinds of transparent solids, such as various kinds of glass, molten quartz, transparent corundum, transparent synthetic and natural resins, etc., can be used. The transparent electrodes can be prepared by vapor-deposition for example, indium oxide or tin oxide onto the support plates. The electrode to be formed on the reflective film may be, for example, a film of copper, aluminum, chromium or nickel.

It is known that in the liquid crystal display device of matrix type as described above, a multiplexing display of many segments can be carried out without flickering by using a nematic liquid crystal material containing ionic substances such as halides of organic quaternary nitrogen compounds, for example, ammonium halides, pyridinium halides, acridinium halides, etc., However, the nematic liquid crystal composition containing these halides is not satisfactory in such characteristics as response speed, stability against changes in temperature, etc., as described above.

The present inventors have found that a nematic liquid crystal composition containing a polyhalide of organic quaternary nitrogen compound, such as an ammonium polyhalide, pyridinium polyhalide, isoquinolinium polyhalide, acridinium polyhalide, etc. can overcome these disadvantages.

Polyhalides of the quaternary nitrogen compound used in the present invention are:

Ammonium polyhalides represented by the following general formula:

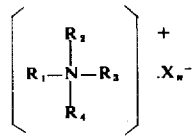

wherein $R_1$, $R_2$, $R_3$ and $R_4$ are alkyl groups having not more than 20 carbon atoms, or phenyl group, X is Cl, Br and I, and $n$ is an integer of 3 or 5, which include quaternary ammonium polyhalides such as, for example, phenyltrimethylammonium triiodide, 4-n-butylphenyltrimethylammonium triiodide, hexadecyltrimethyl ammonium triiodide, tetramethylammonium dichloroiodide, tetramethylammonium chlorobromoiodide, tetramethylammonium tribromide, tetramethylammonium diiodobromide, tetramethylammonium tetraiodochloride, tetramethylammonium tetraiodobromide, etc.

Pyridinium polyhalides represented by the following general formula:

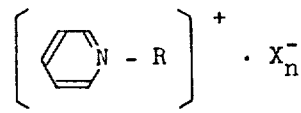

wherein R is an alkyl group having not more than 20 carbon atoms, X is Cl, Br and I, and $n$ is an integer of 3 or 5, which include alkylpyridinium polyhalides such as, for example, 1-hexadecylpyridinium triiodide, 1-dodecylpyridinium triiodide, 1-methylpyridinium triiodide, 1-methylpyridinium tribromide, 1-hexadecylpyridinium diiodobromide, 1-hexadecylpyridinium tribromide, 1-hexadecylpyridinium dichloroiodide, etc.

Isoquinolinium polyhalides, represented by the following general formula:

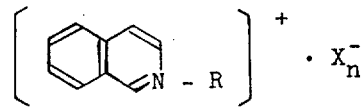

wherein R is an alkyl group having not more than 20 carbon atoms, X is Cl, Br and I, and $n$ is an integer of 3 or 5, which include alkylisoquinolinium polyhalides such as, for example, 2-hexadecylisoquinolinium triiodide, 2-methylisoquinolinium triiodide, 2-hexadecylisoquinolinium diiodobromide, 2-hexadecylisoquinolinium tribromide, 2-hexadecylisoquinolinium dichloroiodide, etc.

Acridinium polyhalides represented by the following general formula:

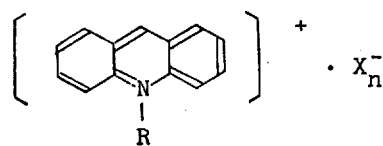

wherein R is an alkyl group having not more than 20 carbon atoms, X is Cl, Br and I, and $n$ is an integer of 3 or 5, which include alkylacridinium polyhalides such as, for example, 10-methylacridinium triiodide, 10-hexadecylacridinium triiodide, 10-hexadecylacridinium diiodobromide, 10-hexadecylacridinium tribromide, 10-hexadecylacridinium dichloroiodide, etc.

The above-mentioned polyhalides can be used as a single compound or in mixture thereof.

As the liquid crystal materials, nematic liquid crystal compounds capable of effecting a dynamic scattering can be used in the present invention. It is desirable that the nematic liquid crystal compounds for the ordinary display devices have a liquid crystal temperature range around room temperature.

The liquid crystal compounds used in the present invention include ordinary liquid crystal compounds such as p-methoxybenzylidene-p-butylaniline, p-ethoxybenzylidene-p-butylaniline, p-butoxybenzyldene-p-butylaniline, p-butoxybenzylidene-p-n-propylaniline, p-hexyloxybenzylidene-p-toluidine, p-pentyloxybenzylidene-p-toluidine, p-heptyloxybenzylidene-p-acetoxyaniline, 4-methoxy-4'-butylazoxybenzene, 4-butyl-4'-methoxyazoxybenzene, etc. These liquid crystal compounds can be used as a single compound or in a mixture thereof.

Excellent electro-optical characteristics can be obtained by adding at least 0.01 % by weight of the polyhalide to said liquid crystal compound, based on the weight of the liquid crystal compound. The upper limit of the polyhalide to be added depends upon a solubility of the polyhalide in the liquid crystal compound used, but the effect becomes less significant when more than 0.5 % by weight of the polyhalide is added to the liquid crystal compound. That is, the desirable upper limit is around 0.5 % by weight of the polyhalide. Particularly preferable range of the polyhalide to be added is 0.05 to 0.2 % by weight, based on the weight of the liquid crystal compound.

Now, the present invention will be described in detail, referring to examples by way of the accompanying drawings.

EXAMPLES 1 – 5

Figure 2:
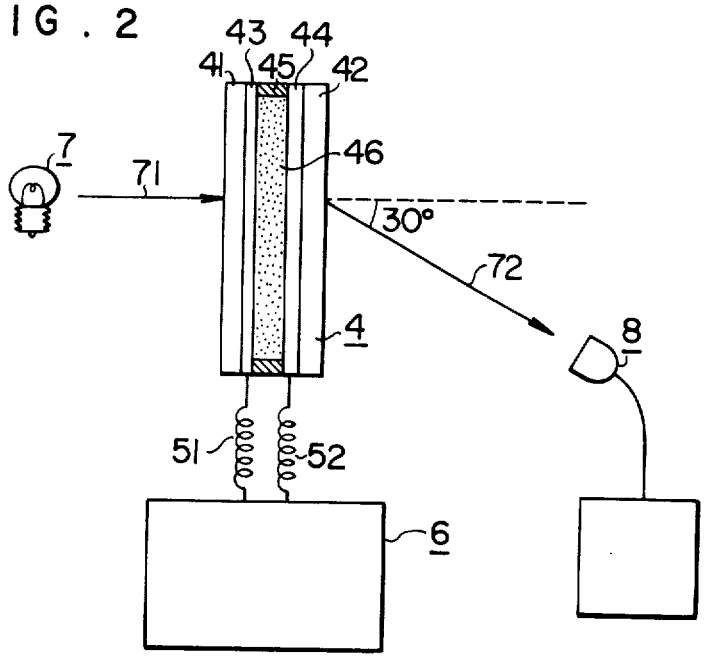
FIG. 2 is a schematic diagram showing a device for measuring contrast and response time of a liquid crystal composition.
Figure 3:
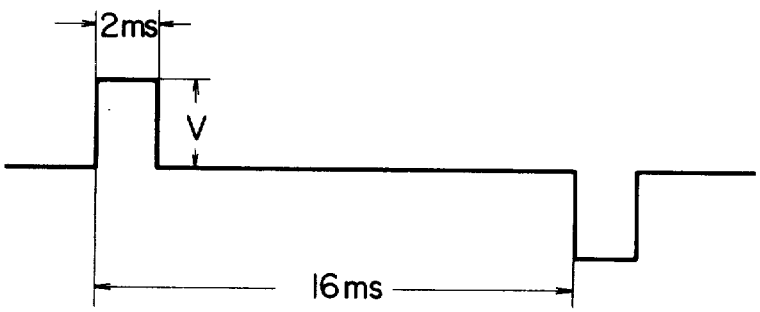
FIG. 3 is a wave form diagram of pulse voltage applied in FIG. 2.

0.1 % by weight of triiodides as given in Table 1 was added to methoxybenzylidene-p-butylaniline, on the basis of the weight of the latter and mixed therewith until the former was completely dissolved therein. The resulting liquid crystal mixture 46 was inserted between glass plates 41, 42 (each 50 mm long, 40 mm wide and 3 mm thick) provided with tin oxide transparent electro conductive films 43, 44 thereon by spraying, and sealed by spacers 45 of polyester film having a film thickness of 9 μ to prepare a kind of transmission type display element 4, as shown in FIG. 2. The transparent electrodes 43, 44 of said display element were connected to a pulse generator 6 through lead wires 51, 52 to apply a pulse voltage to the electrodes, and a two-way pulse voltage of such a wave form as shown in FIG. 3 was applied (pulse width: 2 m sec.; duty ratio: ⅛). An incident light 71 from a light source 7 was scattered by disturbance due to the application of voltage, and the intensity of the scattered light 72 was measured by a light detector means 8 positioned at 30° from the incident light axis to determine a ratio of the light intensity to that when no voltage was applied, that is, the contrast. At the same time, a response time (time needed for attaining 90 % of saturated value of contrast ratio just after the application of pulse voltage) was measured.

The contrast and response time are shown in Table 1 for the case of the applied voltage of 30 V.

From Table 1, it is apparent that the liquid crystal compositions of the present invention had a better contrast and quicker response at such a short pulse width as 2 m sec.

Figure 4:
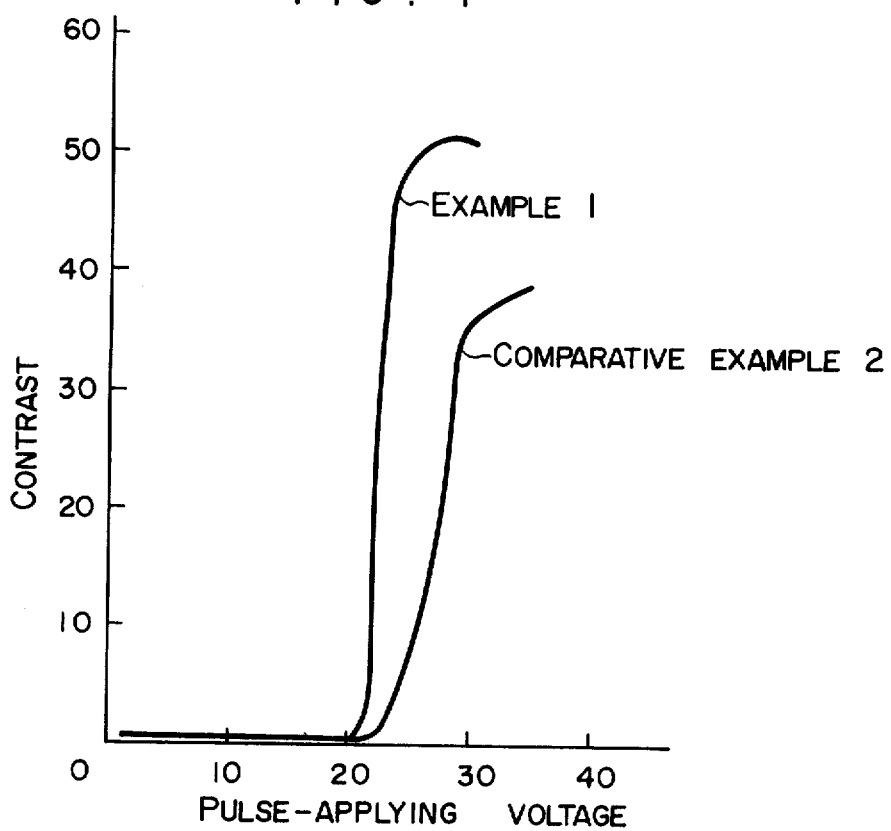
FIG. 4 is a graph showing relations between the contrast of the liquid crystal and pulse voltage in a liquid crystal display device.

In FIG. 4 curves of contrast versus applied voltage of Example 1 and Comparative Example 2 are shown. As is apparent from FIG. 4, Example 1 has a lower threshold voltage than that of Comparative Example 2, and the gradient of the curve of Example 1 more sharply changes. Thus, the liquid crystal composition of the present invention shows excellent characteristics for the display purposes by multiplexing.

Table 1

| Example | Additive | Chemical structure | contrast | Response time (m-sec.) |
|---|---|---|---|---|
| 1 | 4-n-butylphenyl-trimethylammonium triiodide | $[n\text{-Bu}-\text{C}_6\text{H}_4-\text{N}(\text{CH}_3)_3]^+ \cdot \text{I}_3^-$ | 51 | 30 |
| 2 | 1-hexadecylpyridinium triiodide | $[\text{C}_5\text{H}_5\text{N}-\text{C}_{16}\text{H}_{33}]^+ \cdot \text{I}_3^-$ | 47 | 10 |
| 3 | Hexadecyltrimethyl ammonium triiodide | $[\text{C}_{16}\text{H}_{33}-\text{N}(\text{CH}_3)_3]^+ \cdot \text{I}_3^-$ | 53 | 2 |
| 4 | Phenyltriethylammonium triiodide | $[\text{C}_6\text{H}_5-\text{N}(\text{C}_2\text{H}_5)_3]^+ \cdot \text{I}_3^-$ | 42 | 28 |
| 5 | 10-methylacridinium triiodide | [10-methylacridinium]$^+ \cdot \text{I}_3^-$ | 36 | 35 |
| Comparative Example 1 | None | — | 1 | No response |
| Comparative Example 2 | Hexadecyltrimethyl-ammoniumbromide | $[\text{C}_{16}\text{H}_{33}-\text{N}(\text{CH}_3)_3]^+ \cdot \text{Br}^-$ | 14 | 180 |

Liquid crystal substrate: methoxybenzylidene-p-butylaniline

EXAMPLES 6 – 7

0.1 % by weight of 1-hexadecylpyridinium triiodide (which will be hereinafter referred to as HDPTI) was added to the nematic liquid crystal materials given in Table 2, on the basis of the weight of the latter, and dissolved completely therein. Transmission-type display elements were prepared, using these liquid crystal compositions in the same manner as in Examples 1 – 5, and pulse characteristics were determined. Contrast and response time are shown in Table 2 for the case of applied voltage of 30 V.

Table 2

| Example | Liquid crystal composition | Liquid crystal range | Contrast | Response time (m-sec.) |
|---|---|---|---|---|
| 6 | Eutectic mixture of MBAB and BMB, mixed with 0.1 % by weight of HDPTI | 16 – 76°C | 38 | 30 |
| 7 | 6 : 4 mixture of MBBA and EBBA, mixed with 0.1 % by weight of HDPTI | 10 – 48°C | 48 | 15 |
| Comparative Example 3 | 6 : 4 mixture of MBBA and EBBA, mixed with 0.1 % by weight of pyridinium chloride | 16 – 76°C | 33 | 220 |

Note:
MBAB: 4-methoxy-4'-butylazoxybenzene
BMB: 4-butyl-4'-methoxybenzene
HDPTI: 1-hexadecylpyridinium triiodide
MBBA: methoxybenzylidene-p-butylaniline
EBBA: ethoxybenzylidene-p-butylaniline

EXAMPLE 8

Figure 5:
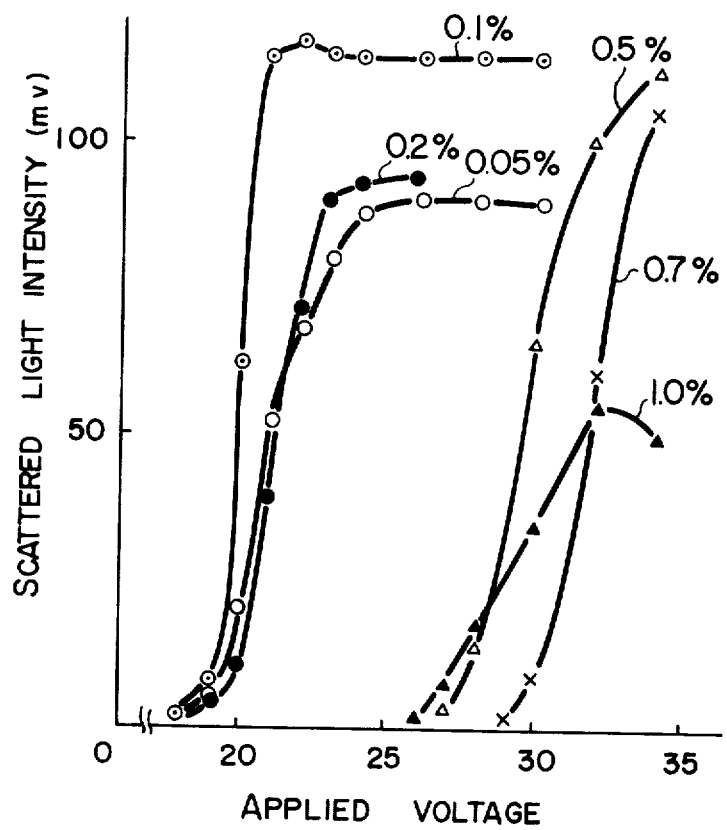
FIG. 5 is a graph showing relations between scattered light intensities of the liquid crystal compositions and applied voltage by way of various amounts of a polyhalide of the present invention added to nematic liquid crystal.

Relations between the applied voltage and scattered light intensity were investigated by adding varied amounts of trimethyl (4-n-butylphenyl)ammonium triiodide to methoxybenzylidene-p-butylaniline (which will be referred to as MBBA), and the results are shown in FIG. 5.

As is apparent from FIG. 5, the effect of the addition tends to be lost when more than 0.5 % by weight of trimethyl(4-n-butylphenyl)ammonium triiodide is added to MBBA. It is seen that the particularly preferable range of the polyhalide is 0.05 to 0.2 % by weight.

EXAMPLES 9 – 11

Relations between threshold voltage and temperature of liquid compositions were investigated for a liquid crystal composition of 6 : 4 mixture of MBBA and EBBA (ethoxybenzylidene-p-butylaniline), mixed with 0.1 % by weight of 4-n-butylphenyltrimethylammonium triiodide (Example 9; Curve a of FIG. 6), a liquid crystalline composition of 6 : 4 mixture of MBBA and EBBA, mixed with 0.1 % by weight of conventional 4-n-butylphenyltrimethylammonium iodide (Example 10; Curve b of FIG. 6) and a composition of single 6 : 4 mixture of EBBA and MBBA (Example 11; Curve c of FIG. 6).

Figure 6:
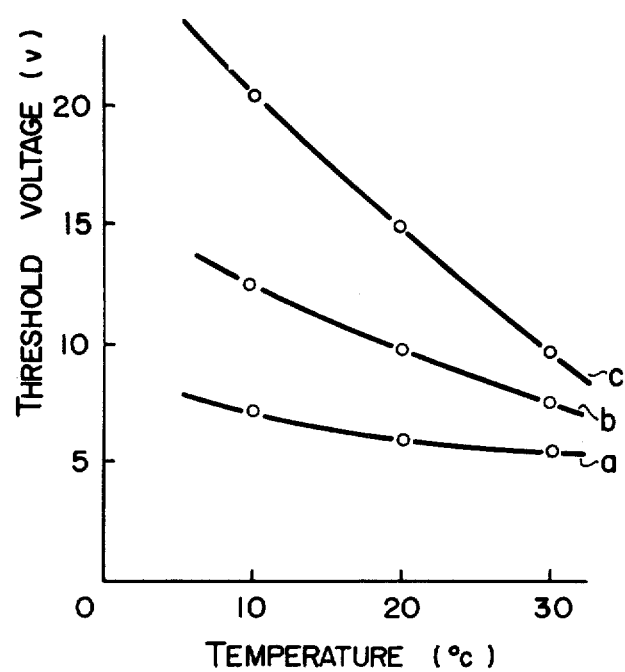
FIG. 6 is a graph showing relations between temperature and threshold voltages.

As is apparent from FIG. 6, the liquid crystalline composition of the present invention has a stable threshold voltage against changes in temperature, and by using the present liquid crystalline composition in a liquid crystal display device, a temperature compensation device for a driving circuit or a temperature control device for a display element (display panel) will not be required, and the liquid crystal display device will be made compact thereby.

EXAMPLES 12 – 14

Solubilities of three polyhalides and corresponding conventional monohalides in a liquid crystal were determined. As the liquid crystal, a 6 : 4 mixture of MBBA and EBBA was used. The solubilities of the polyhalides and monohalides in the liquid crystal at 20°C are shown in Table 3.

Table 3

| Example | Halides | Solubility (%) |
|---|---|---|
| 12 | $[C_4H_9-\bigcirc-N(CH_3)_3]^+ \cdot I_3^-$ | 1.31 |
| 13 | $[C_{16}H_{33}-N\bigcirc]^+ \cdot I_3^-$ | 1.52 |
| 14 | $[C_4H_9-N]^+ \cdot I_3^-$ | 1.90 |
| Comparative Example 4 | $[C_4H_9-\bigcirc-N(CH_3)_3]^+ \cdot I^-$ | 0.12 |
| Comparative Example 5 | $[C_{16}H_{33}-N\bigcirc]^+ \cdot I^-$ | 0.15 |
| Comparative Example 6 | $[C_4H_9-N]^+ \cdot I^-$ | 0.23 |

As is apparent from Table 3, the polyhalides of the present invention have a better solubility in the nematic liquid crystal then the conventional monohalides. When liquid crystal compositions of 6 : 4 mixture of MBBA and EBBA, mixed with 0.1 % by weight of monohalides used in the foregoing Comparative Examples 4 – 6 were left standing at 0°C for 24 hours, the halides were deposited as crystals in the liquid crystal compositions. However, when the liquid crystal compositions of the same 6 : 4 mixture of MBBA and EBBA, mixed with the polyhalides of the foregoing Examples 12 – 14, were left standing at 0°C as well as –5°C even for one week, no crystal deposition was observed. It is seen from these results that the liquid crystal compositions of the present invention are very stable against changes in temperature.

EXAMPLE 15

0.2 % by weight of 1-hexadecylpyridinium bromide was added to a liquid crystal composition of 1 : 1 mixture of MBBA and EBBA, and dissolved therein by heating. The resulting composition was placed in the liquid crystal display device as given in Example 1, and sealed in vacuum. When the display device was left standing at 10°C for 24 hours, crystals of said bromide were deposited on the entire surfaces of the element. On the other hand, when the display device containing a liquid crystal composition of said 1 : 1 mixture of MBBA and EBBA, mixed with 0.1 % by weight of trimethyl(4-n-butylphenyl)-ammonium triiodide was left standing at 0°C for 24 hours, no deposition of crystals of said triiodide was observed at all. It is seen from these results that the triiodide has a better solubility in the liquid crystals.

As is apparent from the foregoing examples, the liquid crystal compositions of the present invention have better electro-optical characteristics, especially quicker response to voltages of short pulse width, than the conventional liquid crystal compositions, and therefore excellent response characteristics can be obtained by using the liquid crystal compositions of the present invention than by using the conventional ones. Furthermore, the reliability of a liquid crystal display device can be improved by using a polyhalide of organic quaternary nitrogen compound having a good solubility in the nematic liquid crystal material.

What is claimed is:

1. In an electro-optical display device comprising a nematic liquid crystal capable of effecting dynamic scattering; means for supporting said liquid crystal layer; a plurality of first electrode means for applying a pulse electric field to said liquid crystal layer, said liquid crystal layer being divided thereby into a plurality of segments; second electrode means for applying a pulse electric field to said liquid crystal layer, the second electrode means being positioned opposite to the first electrode means, the liquid crystal layer being sandwiched between the first electrode means and the second electrode means; and means for applying a pulse electric field through the first and second electrode means to the segments of the liquid layer by multiplexing, the improvement comprising the liquid crystal layer containing an effective amount of at least one polyhalide of an organic quaternary nitrogen compound in which the halogen atoms are selected from the group consisting of chlorine, bromine and iodine to enhance the dynamic scattering motion of said liquid crystal layer.

2. An electro-optical display device according to claim 1, wherein the polyhalides of the organic quaternary nitrogen compounds are quaternary ammonium polyhalides represented by the following general formula:

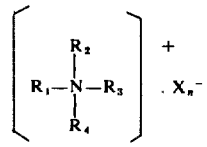

wherein $R_1$, $R_2$, $R_3$ and $R_4$ are members selected from the group consisting of alkyl groups having not more than 20 carbon atoms and phenyl groups, X is a halogen atom independently selected from chlorine, bromine and iodine, and $n$ is an integer equal to 3 or 5.

3. An electro-optical display device according to claim 2, wherein $X_n^-$ comprises at least two different halogen atoms.

4. An electro-optical display device according to claim 1, wherein the polyhalides of the organic quaternary nitrogen compounds are pyridinium polyhalides represented by the following general formula:

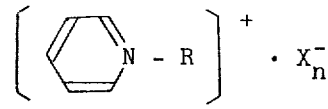

wherein R is a member selected from the group consisting of alkyl groups having not more than 20 carbon atoms, X is a halogen atom independently selected from chlorine, bromine and iodine, and $n$ is an integer equal to 3 or 5.

5. An electro-optical display device according to claim 4, wherein $X_n^-$ comprises at least two different halogen atoms.

6. An electro-optical display device according to claim 1, wherein the polyhalides of the organic quaternary nitrogen compounds are iso-quinolinium polyhalides represented by the following general formula:

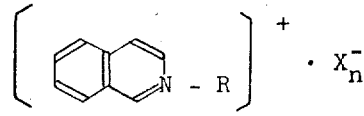

wherein R is a member selected from the group consisting of alkyl groups having not more than 20 carbon atoms, X is a halogen atom independently selected from chlorine, bromine and iodine, and $n$ is an integer equal to 3 or 5.

7. An electro-optical display device according to claim 6, wherein $X_n^-$ comprises at least two different halogen atoms.

8. An electro-optical display device according to claim 1, wherein the polyhalides of the organic quaternary nitrogen compounds are acridinium polyhalides represented by the following general formula:

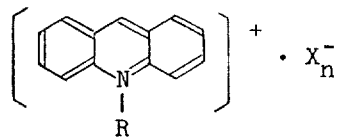

wherein R is a member selected from the group consisting of alkyl groups having not more than 20 carbon atoms, X is a halogen atom independently selected from chlorine, bromine and iodine, and $n$ is an integer equal to 3 or 5.

9. An electro-optical display device according to claim 8, wherein $X_n^-$ comprises at least two different halogen atoms.

10. An electro-optical display device according to claim 1, wherein the liquid crystal layer contains 0.01 to 0.5 weight % of the polyhalides based on the weight of the liquid crystal.

11. In an electro-optical display device comprising a liquid crystal layer containing nematic liquid crystals capable of effecting dynamic scattering; means for supporting said liquid crystal layer; a plurality of first electrode means for applying a pulse voltage to said liquid crystal layer; second electrode means for applying a pulse electric field to the liquid crystal layer together with the first electrode means, the liquid crystal layer being sandwiched between the first and second electrode means; and means for selecting an electrode to be applied with an electric field by multiplexing, thereby the electric field being applied to the liquid crystal layer in a desired sequence through a plurality of the desired electrodes of a plurality of said first electrode means, the improvement comprising the liquid crystal layer containing an effective amount of at least one polyhalide of an organic quaternary nitrogen compound to enhance the dynamic scattering motion of said liquid crystal layer, said polyhalide of the organic quaternary nitrogen compound being selected from ammonium polyhalides, pyridinium polyhalides, isoquinolinium polyhalides and acrindinium polyhalides represented by the following general formulae (I), (II), (III), and (IV), respectively:

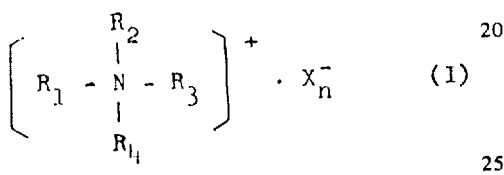

(I)

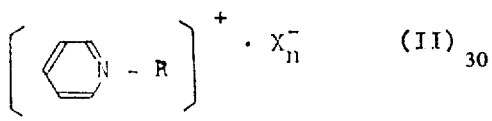

(II)

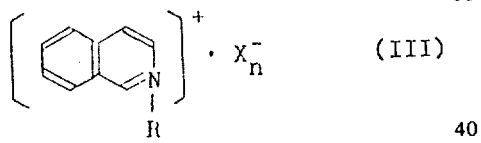

(III)

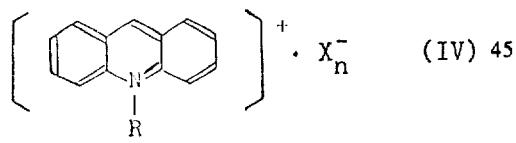

(IV)

wherein $R_1$, $R_2$, $R_3$, $R_4$ and $R$ are members selected from the group consisting of alkyl groups having not more than 20 carbon atoms, X are halogen atoms independently selected from chlorine, bromine and iodine and n is an integer equal to 3 or 5.

12. An electro-optical display device according to claim 11, wherein the liquid crystal layer contains 0.01 to 0.5 weight % of the polyhalides based on the weight of the liquid crystal.

13. An electro-optical display device having a liquid crystal capable of effecting dynamic scattering motion and comprising:
1. a pair of supporting members, at least one of them being transparent;
2. a layer of nematic liquid crystal containing at least one polyhalide of an organic quaternary nitrogen compound in which the halogen atoms are selected from the group consisting of chlorine, bromine and iodine, said polyhalide dissolved therein in an amount effective to enhance said dynamic scattering motion of said liquid crystal, said layer being interposed between said supporting members;
3. first electrode means for applying a pulsating electric field for generating said dynamic scattering motion to said layer, wherein a plurality of displaying segments are formed by said first electrode means in said layer;
4. second electrode means for applying said pulsating electric field in cooperation with said first electrode means, said first and second electrode means being formed on the inner surfaces of said respective supporting members;
5. a pulse generator for producing a pulse having an amplitude larger than a dynamic scattering motion limit but smaller than a discharge voltage of said liquid crystal and a pulse width smaller than 10 ms; and
6. means operatively connected to said pulse generator for selectively supplying said pulse at predetermined time intervals to the selected electrodes of said first electrode means and of said second electrode means in a predetermined order in order to apply said pulsating electric field to the selected segments corresponding to said selected electrodes thereby to generate said dynamic scattering motion in said liquid crystal of said selected segments, said time intervals being smaller than a period in which an intensity of light scattering to be observed decays to a predetermined value.

14. An electro-optical display device according to claim 13, wherein the polyhalides of the organic quaternary nitrogen compounds are quaternary ammonium polyhalides represented by the following general formula:

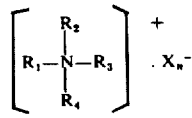

wherein $R_1$, $R_2$, $R_3$ and $R_4$ are members selected from the group consisting of alkyl groups having not more than 20 carbon atoms and phenyl groups, X is a halogen atom independently selected from chlorine, bromine and iodine, and n is an interger equal to 3 or 5.

15. An electro-optical display device according to claim 13, wherein the polyhalides of the organic quaternary nitrogen compounds are pyridinium polyhalides represented by the following general formula:

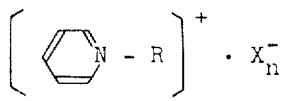

wherein R is a member selected from the group consisting of alkyl groups having not more than 20 carbon atoms, X is a halogen atom independently selected from chlorine, bromine and iodine, and $n$ is an integer equal to 3 or 5.

16. An electro-optical display device according to claim 3, wherein the polyhalides of the organic quaternary nitrogen compounds are isoquinolinium polyhalides represented by the following general formula:

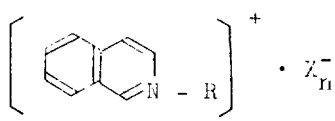

wherein R is a member selected from the group consisting of alkyl group having not more than 20 carbon atoms, X is a halogen atom independently selected from chlorine, bromine and iodine, and n is an integer equal to 3 or 5.

17. An electro-optical display device according to claim 13, wherein the polyhalides of the organic quaternary nitrogen compounds are acridinium polyhalides represented by the following general formula:

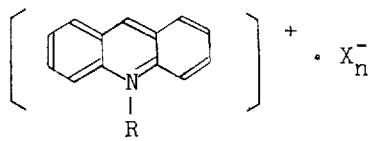

wherein R is a member selected from the group consisting of alkyl groups having not more than 20 carbon atoms, X is a halogen atom independently selected from chlorine, bromine and iodine, and n is an integer equal to 3 or 5.

18. An electro-optical display device according to claim 13, wherein the liquid crystal layer contains 0.01 to 0.5 weight % of the polyhalides based on the weight of the liquid crystal.

19. An electro-optical display device according to claim 13, wherein the polyhalides of the organic quaternary nitrogen compounds are quaternary ammonium triiodides represented by the following general formula:

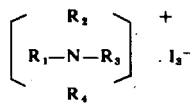

wherein $R_1$, $R_2$, $R_3$ and $R_4$ are members selected from the group consisting of alkyl groups having not more than 20 carbon atoms and phenyl groups.

20. An electro-optical display device according to claim 13, wherein the polyhalides of the organic quaternary nitrogen compounds are pyridinium triiodides represented by the following general formula:

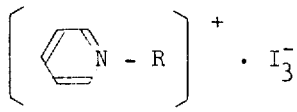

wherein R is an alkyl group having not more than 20 carbon atoms.

21. An electro-optical display device according to claim 13, wherein the polyhalides of the organic quaternary nitrogen compounds are isoquinolinium triiodides represented by the following general formula:

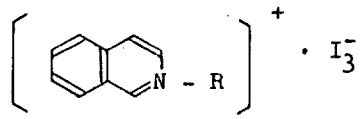

wherein R is an alkyl group having not more than 20 carbon atoms.

22. An electro-optical display device according to claim 13, wherein the polyhalides of the organic quaternary nitrogen compounds are acridinium triiodides represented by the following general formula:

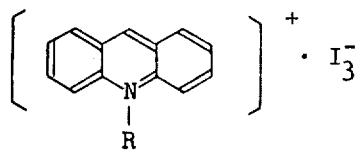

wherein R is an alkyl group having not more than 20 carbon atoms.

23. An electro-optical display device according to claim 1, wherein the polyhalides of the organic quaternary nitrogen compounds are quaternary ammonium triiodides represented by the following general formula:

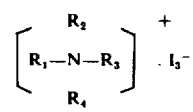

wherein $R_1$, $R_2$, $R_3$ and $R_4$ are members selected from the group consisting of alkyl groups having not more than 20 carbon atoms and phenyl groups.

24. An electro-optical device according to claim 1, wherein the polyhalides of the organic quaternary nitrogen compounds are pyridinium triiodides represented by the following general formula:

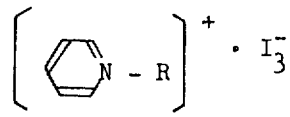

wherein R is an alkyl group having not more than 20 carbon atoms.

25. An electro-optical display device according to claim 1, wherein the polyhalides of the organic quaternary nitrogen compounds are isoquinolinium triiodides represented by the following general formula:

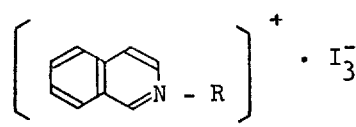

wherein R is an alkyl group having not more than 20 carbon atoms.

26. An electro-optical display device according to claim 1, wherein the polyhalides of the organic quaternary nitrogen compounds are acridiniium triiodides represented by the following general formula:

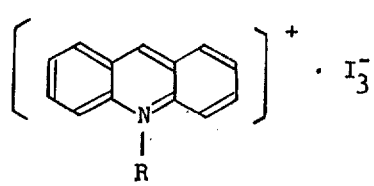

wherein R is an alkyl group having not more than 20 carbon atoms.

27. In an electro-optical display device comprising a liquid crystal layer containing a nematic liquid crystal capable of effecting dynamic scattering; means for supporting said liquid crystal layer; a plurality of first electrode means for applying a pulse voltage to said liquid crystal layer; second electrode means for applying a pulse electric field to the liquid crystal layer together with the first electrode means, the liquid crystal layer being sandwiched between the first and second electrode means; and means for selecting an electrode to be applied with an electric field by multiplexing, thereby the electric field being applied to the liquid crystal layer in a desired sequence through a plurality of the desired electrodes of a plurality of said first electrode means, the improvement comprising the liquid crystal layer containing an effective amount of at least one of triiodides of organic quaternary nitrogen compounds to enhance dynamic scattering motion of said liquid crystal, said triiodides of the organic quaternary nitrogen compounds being selected from ammonium triiodides, pyridinium triiodides, isoquinolinium triiodides and acridinium triicodides represented by the following general formulae (I), (II'), (III') and (IV'), respectively:

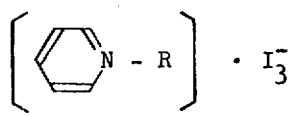

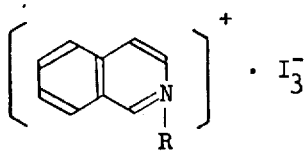

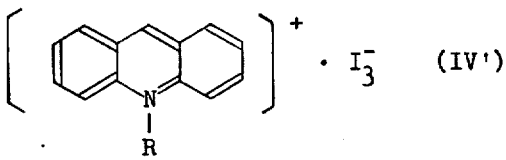

wherein $R_1$, $R_2$, $R_3$, $R_4$ and R are alkyl groups having not more than 20 carbon atoms.

* * * * *